(12) United States Patent
Krishnamurthy et al.

(10) Patent No.: US 8,881,421 B2
(45) Date of Patent: Nov. 11, 2014

(54) DIPSTICK ASSEMBLY WITH LOCK SYSTEM

(75) Inventors: Ramnath Kaushik Krishnamurthy, Rochester Hills, MI (US); Ernest Scott Haigler, Wingate, NC (US); Barry N. Skelton, Greenville, MS (US); Jeffery Donald Skwor, Greenville, MS (US); Andrew David Beyer, Kentwood, MI (US)

(73) Assignee: Center Manufacturing, Inc., Byron Center, MI (US)

( * ) Notice: Subject to any disclaimer, the term of this patent is extended or adjusted under 35 U.S.C. 154(b) by 355 days.

(21) Appl. No.: 13/475,614

(22) Filed: May 18, 2012

(65) Prior Publication Data

US 2013/0305552 A1  Nov. 21, 2013

(51) Int. Cl.
*G01F 23/04* (2006.01)

(52) U.S. Cl.
CPC ....................................... *G01F 23/04* (2013.01)
USPC ............................................. 33/728; 33/722

(58) Field of Classification Search
CPC .... G01F 23/04; G01F 23/045; F16H 57/0449
USPC .................................................... 33/722–731
See application file for complete search history.

(56) References Cited

U.S. PATENT DOCUMENTS

| | | | |
|---|---|---|---|
| 3,722,102 A | 3/1973 | Jackson et al. | |
| 5,154,005 A * | 10/1992 | Lalevee, Sr. | 33/726 |
| 5,485,681 A | 1/1996 | Hitchcock | |
| 5,829,153 A | 11/1998 | Hitchock | |
| 6,453,740 B1 * | 9/2002 | Williams et al. | 33/722 |
| 7,055,384 B2 | 6/2006 | Williams et al. | |
| 7,100,744 B2 | 9/2006 | Kettle et al. | |
| 7,134,220 B2 | 11/2006 | Porter et al. | |
| 7,373,912 B2 * | 5/2008 | Self et al. | 123/196 R |
| 7,694,430 B1 * | 4/2010 | Groot | 33/728 |
| 7,979,999 B2 * | 7/2011 | Goldstein et al. | 33/725 |
| 8,136,261 B2 * | 3/2012 | Armistead | 33/727 |
| 2002/0189344 A1 * | 12/2002 | Dougherty et al. | 73/290 R |
| 2003/0150125 A1 * | 8/2003 | Dougherty et al. | 33/722 |
| 2011/0061254 A1 * | 3/2011 | Armistead | 33/725 |
| 2011/0061255 A1 * | 3/2011 | Goldstein et al. | 33/725 |

FOREIGN PATENT DOCUMENTS

| | | |
|---|---|---|
| DE | 29709019 U1 | 8/1997 |
| FR | 2849187 A1 | 6/2004 |

* cited by examiner

*Primary Examiner* — G. Bradley Bennett
(74) *Attorney, Agent, or Firm* — Venable LLP; Michele V. Frank (57) ABSTRACT

A dipstick assembly includes a lock system. A cap has a blade, cable or extension for measuring fluid levels. The locking system has the ability to limit the assembly of a locking dipstick to one radial position. The cap has an engagement end. A cup has a receiving end. The engagement end of the cap is removably sealably disposable in the receiving end of the cup. The lock system may include a pair of slots on the cap and a pair of lugs on the cup, and a tab on the cap and a shoulder/recess on the cup that cooperate to limit the system to one way assembly. The tab and recess also provide a visible lock indicator to confirm that the slots and lugs, which are not visible, are fully engaged and locked.

22 Claims, 6 Drawing Sheets

FIG. 7 WRONG DIRECTION

FIG. 6 OPEN

FIG. 5 LOCK

FIG. 8C BACK

FIG. 8B FRONT

FIG. 8A LEFT

DIPSTICK ASSEMBLY WITH LOCK SYSTEM

TECHNICAL FIELD OF THE INVENTION

The present invention relates generally to dipstick assemblies and, more particularly, to a dipstick system with a lock system including a uni-directional lock and/or a visual lock indicator.

BACKGROUND OF THE INVENTION

Dipsticks can be used to measure the quantity of liquid in an otherwise inaccessible space, by inserting and removing the stick and then checking the extent to which it is covered by the liquid. The most familiar example is the oil level dipstick found on most internal combustion engines.

Some dipsticks can be locked into position. But, frequently, the lock is not visible and/or can have multiple assembly orientations.

Generally, a need exists for improved dipstick assemblies that are able to measure fluid levels in a more reliable manner over the life of the assembly. Further a need exists for a dipstick with a visual, positive, accurate and reliable indication that the dipstick is securely in place.

BRIEF SUMMARY OF THE INVENTION

An embodiment of the present invention may provide a dipstick assembly, including a dipstick including a cap with an extension extending from the cap for measuring a fluid level, the cap having a gripping end and a distal engagement end; and a cup for cooperatively engaging with the cap, a slot and a tab on one of the cap and the cup and a lug and a recess on the other of the cap and the cup, wherein the cap and the cup cooperatively engage in both an unlocked engagement position and a locked engagement position, in the unlocked engagement position the tab is disposed in one end of the recess and a portion of the slot engages the lug; in the locked engagement position the tab is disposed in another end of the recess and a remaining portion of the slot engages the lug creating a lock between the slot and the lug, wherein the tab and recess limit assembly of the cap and cup to one locked position relative to each other.

In another aspect of the invention, the slot and tab are on the cap and the lug and recess are on the cup and wherein the cup has a rim and the recess is separated longitudinally from the rim such that engagement of the tab and the rim does not allow the handle and the cup to be in either of the unlocked and locked engagement positions, but engagement of the tab and the recess does.

In another aspect of the invention, the cap and cup are rotatable about 90 degrees when the tab is positioned in the recess.

In another aspect of the invention, the slot and tab are on the cap and the lug and recess are on the cup and wherein the cap has a wall and the slot is disposed in the wall.

In another aspect of the invention, the slot and tab are on the cap and the lug and recess are on the cup and wherein the cup has an interior wall and the lug is disposed on the interior wall.

In another aspect of the invention, the slot is a bayonet slot.

In another aspect of the invention, the cap is rotatable in only one direction.

In another aspect of the invention, the dipstick assembly further includes an unlocked indicator, wherein in the unlocked engagement position the tab of the dipstick is disposed in one end of the recess associated with the unlocked indicator and a portion of the slot engages the lug of the cup; and a locked indicator, wherein in the locked engagement position the tab of the dipstick is disposed in another end of the recess associated with the locked indicator and a remaining portion of the slot engages the lug creating a lock between the slot and the lug.

In another aspect of the invention, in the locked engagement position, the slot and the lug are interior and are not visible from an exterior of the dipstick assembly and the tab and recess remain, at least in part, on an exterior of the dipstick assembly and capable of being visible to an operator.

In another aspect of the invention, the lug is a pair of diametrically opposed lugs and the slot is a pair of diametrically opposed slots.

In another aspect of the invention, the recess has a circumferential length and the slot has a portion with a circumferential length that is substantially equal to the recess circumferential length.

In another aspect of the invention, the dipstick assembly further includes a lock indication system comprising a tab on the cap and a recess on the cup, the tab having an unlocked position and a locked position different from the locked position, the unlocked position corresponds with one arrangement of the slot and the lug and the locked position corresponds with another arrangement of the slot and lug, which is different from the one arrangement in the unlocked position.

In another aspect of the invention, the cap and the cup are capable of locking in either a clockwise or a counter clockwise manner, and the tab and recess limit the cap and cup to one locked radial position and uni-directional locking. In another aspect of the invention, the slot and tab are on the cap and the lug and recess are on the cup.

In another aspect of the invention, a dipstick with a lock system, includes a cap with an extension for measuring fluid levels, the cap having an engagement end; a cup having a receiving end, wherein the engagement end of the cap is removably sealably disposable in the receiving end of the cup; and a lock system comprising a pair of slots on the cap and a pair of lugs on the cup, the pair of slots being capable of engaging the pair of lugs in only one radial position every time the cap and cup are locked together.

In another aspect of the invention, the tab is positioned on the cap relative to the slot at a predetermined location. In another aspect of the invention, each slot is an L-shaped slot and each lug is disposed in a first leg of the L-shaped slot in the unlocked position and in the first and a second leg of the L-shaped slot in the locked position. In another aspect of the invention, the extension is a blade or a cable.

In another aspect of the invention, the dipstick may further include a lock system comprising a tab on the cap and a recess on the cup, the tab having an unlocked position and a locked position different from the locked position, the unlocked position corresponds with one arrangement of the slot and the lug and the locked position corresponds with another arrangement of the slot and lug, which is different from the one arrangement in the unlocked position.

In another aspect of the invention, the recess has a length equal to a length of the second leg. In another aspect of the invention, the tab and recess further comprise a lock indication system by associating a position of the tab in the recess with a locked position and an unlocked position. In another aspect of the invention, the lock indication system has markings on one of the tab and the recess.

Additional features, advantages, and embodiments of the invention are set forth or apparent from consideration of the following detailed description, drawings and claims. Moreover, it is to be understood that both the foregoing summary of the invention and the following detailed description are exemplary and intended to provide further explanation without limiting the scope of the invention as claimed.

BRIEF DESCRIPTION OF DRAWINGS

The accompanying drawings, which are included to provide a further understanding of the invention and are incorporated in and constitute a part of this specification, illustrate preferred embodiments of the invention and together with the detailed description serve to explain the principles of the invention. In the drawings.

DETAILED DESCRIPTION

The present invention provides for a dipstick assembly. The dipstick assembly has a lock or locking system. The locking system has the ability to inhibit or limit the assembly of a locking dipstick to one radial position, which can be referred to as a uni-directional locking feature. This is preferably accomplished through the use of a protrusion and/or mating recess as discussed in more detail below. The position and orientation of these features can vary. This uni-directional locking feature can improve the accuracy in oil level readings. The uni-directional configuration forces an operator to insert and lock the dipstick the same way every time. This consistency prevents potential twisting and fatigue of the dipstick. As a result, repeatability of measurements over time is improved. With a compromised dipstick, for example, an operator may get a shorter reading and overfill the fluid.

The dipstick assembly may also include a lock indication system visually indicating that the dipstick is locked securely in place.

The dipstick assembly may be used to monitor fluid levels, such as, fluid levels in engines.

Figure 1:
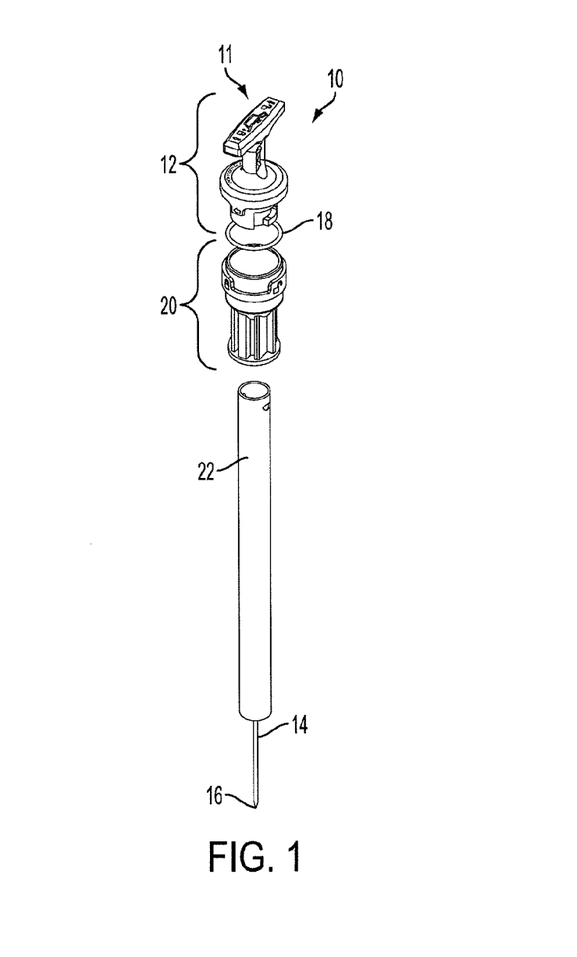
FIG. 1 is an exploded perspective view of a dipstick assembly in one orientation in accordance with an embodiment of the invention.
Figure 2:
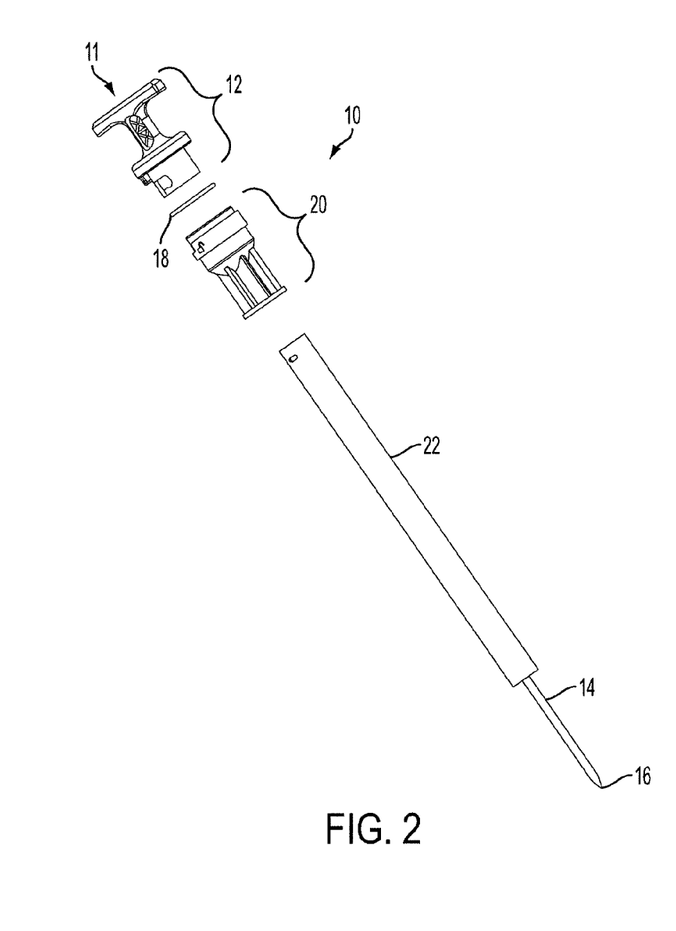
FIG. 2 is another exploded perspective view of the dipstick assembly shown in FIG. 1, but from a slightly different orientation.
Figure 3:
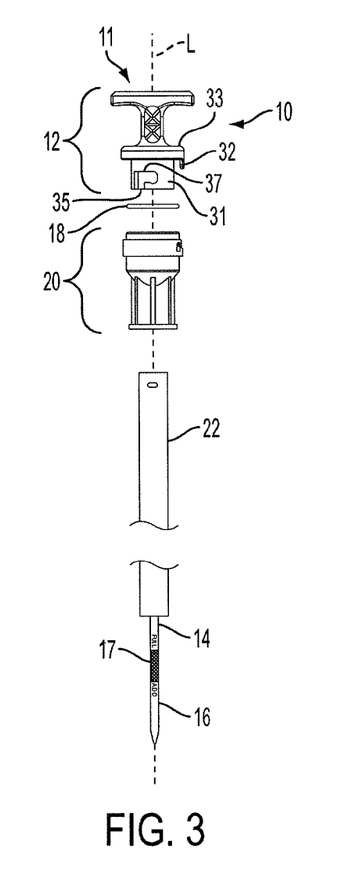
FIG. 3 is an exploded side view of the dipstick assembly shown in FIG. 1, but from yet another orientation.

FIGS. 1-8E illustrate an embodiment of the dipstick assembly shown generally at dipstick 10. Referring to FIGS. 1-3, dipstick assembly 10 generally includes a dipstick 11, a seal 18, a cup 20 and a sleeve or sheath 22. The dipstick assembly 10 has a generally longitudinal axis L.

Referring to FIGS. 1-3, dipstick 11 as shown includes a cap 12, a blade, shaft or stick 14 extending from cap 12 and terminating at a distal tip 16. Cap 12 generally has a gripping end for manual operation of the handle and a distal engagement end that may be coupled with cup 20 to create a tight leak-proof seal. A blade as shown is one option for measure fluid levels, however, in the alternative, a cable could be used or any other extension that meets the needs.

Figure 4A:
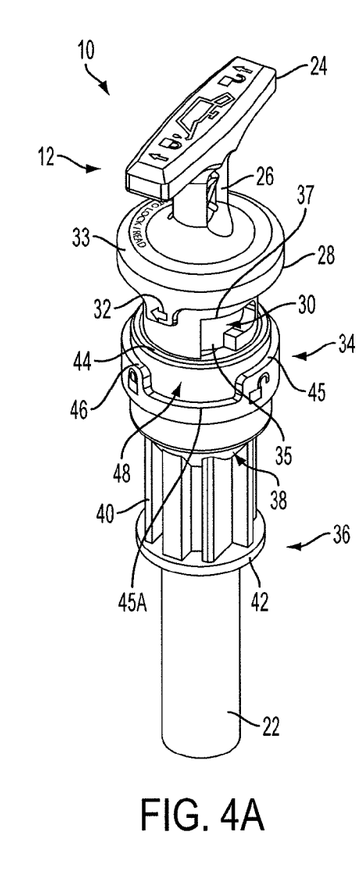
FIG. 4A is perspective view of an end of the dipstick assembly with the cap and the cup shown separated.
Figure 4B:
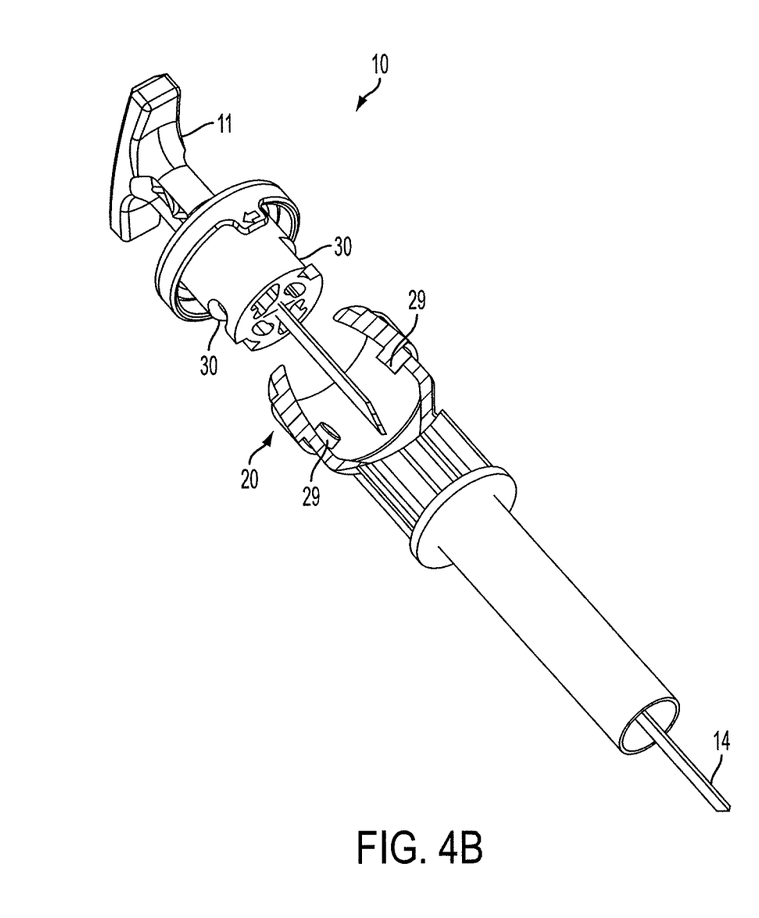
FIG. 4B is a perspective view of an end of the dipstick assembly with the cap separated from the cup, the two slots shown on the cap and the cup partially cut-away to show the two lugs.

As shown in FIG. 4A, cap 12 generally includes a handle 24, a neck 26 and a head 28. The parts of the lock and the lock indication system on cap 12 may include slots 30 and a tab 32, the operation of which is discussed in more detail below. The slots are each preferably a bayonet slot. FIGS. 3 and 4 show a preferred configuration of slots 30. Slots 30 are generally L-shaped. The first leg of the L-shape extends along the longitudinal axis L (FIG. 3). The second leg of the L-shape extends substantially perpendicular to the longitudinal axis L and terminates in a generally expanded configuration as shown. As shown in FIG. 4B, preferably two slots 30 are provided for sealing purposes. One or more slots 30 may be used depending upon the application of use.

Head 28 includes a rim 33 (FIG. 3) and, extending longitudinally beyond rim 33, is a cylindrical portion 31 in which slots 30 formed. Rim 33 has a larger diameter than cylindrical portion 31. Tab 32 extends from rim 33 as shown. With this arrangement, cylindrical portion 31 may be positioned inside cup 20, while tab 32 is positioned to be visibly exposed when cap 12 and cup 20 are engaged and coupled to each other. Tab 32 extends substantially in the direction of the longitudinal axis and has a generally rectangular configuration, but the configuration may vary. Tab 32 may be sized to fit into and operate within corresponding structure in cup 20, discussed in more detail below. Tab 32 is part of the lock indication system. Tab 32 may include markings. As shown, tab 32 includes a directional arrow representing the direction from an unlocked to a locked position with respect to cup 20, as discussed in more detail below. Alternatively and/or in addition, markings may be included on handle 24 as shown in FIG. 4.

The placement of tab 32 relative to slots 30, both of which are on cap 12, may be such that rotation of cap 12 and thereby rotation of tab 32 relates to the rotation of slots 30. For example, the placement of tab 32 may be in a position about 90 degrees rotation around the longitudinal axis from the terminus of slot 30, however, it can be in any degrees of rotation in accordance with the principles of the invention. Thus, the distance and placement of tab 32 relative to slot 30 creates a predetermined and fixed relationship there between. Accordingly, the visible placement of tab 32 indicates the position of slots 30 and the locking engagement with cup 20 as discussed in more detail below.

Cup 20 has an entry end 34 that is open to receive dipstick 11 and an exit end attached to sleeve 22. Referring also to FIGS. 9A-F, cup 20 has a tapered section 38 (FIGS. 9C and 9F) to assist in guiding the blade through cup 20. On the exterior of cup 20, toward exit end 36, are ribs 40 and a flange 42. On the entry end 34, cup 20 has an interior and an exterior. The interior includes lugs 29 (shown in FIG. 4B) that corresponds to the structure of slots 30, the lugs 29 comprising the male engagement structure extending from the interior of cup 20. Lugs 29 are capable of cooperatively mating with slots 30, as discussed in more detail in the following. The exterior of cup 20 on entry end 34 includes a rim 44, a shoulder 46 and a recess or pocket 48. Rim 44 is the substantially the outermost edge of cup 20 on entry end 34. Shoulder 46 is spaced slightly away from rim 44 in the direction of exit end 36. Shoulder 46 defines a substantially flat circumferential ridge 45 substantially most of which lies in the same plane. Except, a recessed portion 45A of ridge 45 lies in a spaced apart plane, as shown, recessed portion 45A lies in a plane substantially parallel to the plane defined by ridge 45. Recess 48 may be configured in a generally rectangular shape. Ridge 45 has a diameter more than the inside diameter of rim 33, as discussed in more detail below. For example, the sizing can vary and the function will also work if the diameter is much larger. As shown in FIG. 4A, one end of recess 48 has a marking showing an unlocked position and the other end has a marking showing a locked position. As discussed in more detail below, when tab 32 is positioned in recess 48, tab 32 can travel between each of the ends in the recess. The location of tab 32 in the recess provides a visual indication of the locking position of cap 12 in cup 20.

Figure 5:
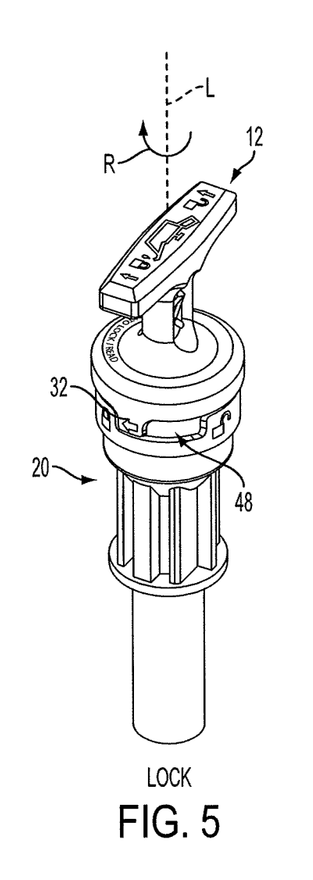
FIG. 5 is a perspective view of the end of the dipstick assembly with the cap locked in the cup.
Figure 6:
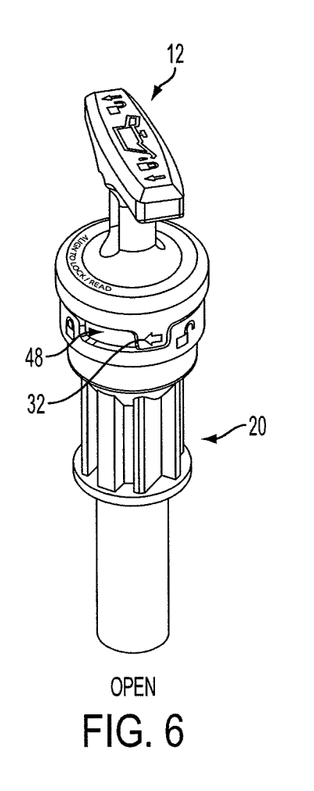
FIG. 6 is a perspective view of the end of the dipstick assembly with the cap inserted into the opening of the cup and in the unlocked position.
Figure 7:
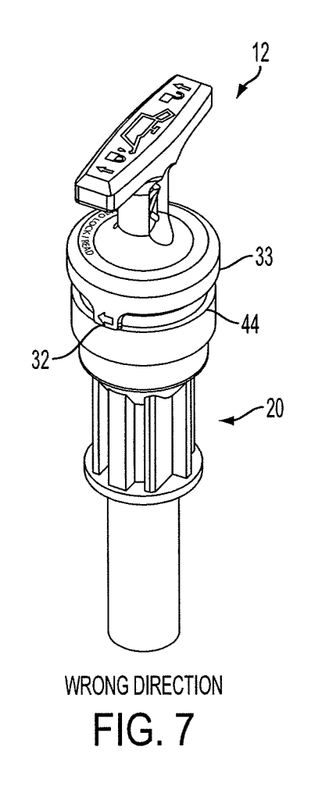
FIG. 7 is a perspective view of the end of the dipstick assembly demonstrating the cap incorrectly aligned for insertion into the opening in the cup.
Figure 8A:
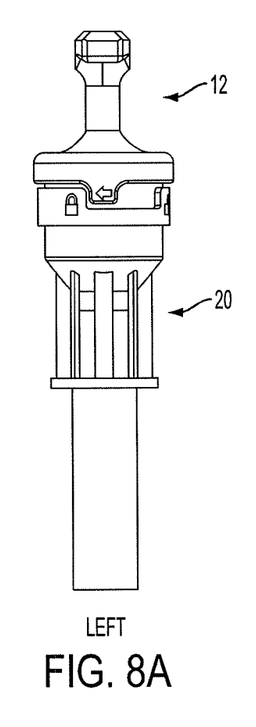
FIGS. 8A-8E are side views and a top view of the dipstick assembly with the lock indication system indicating the cap is locked with respect to the cup.
Figure 8B:
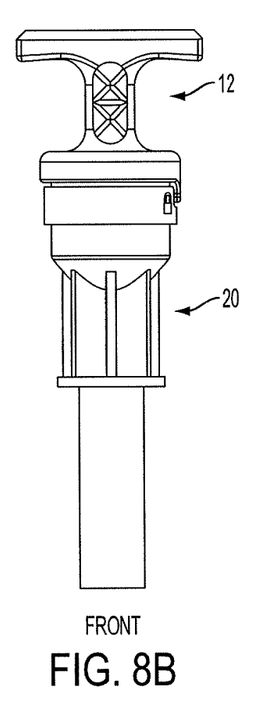
Figure 8C:
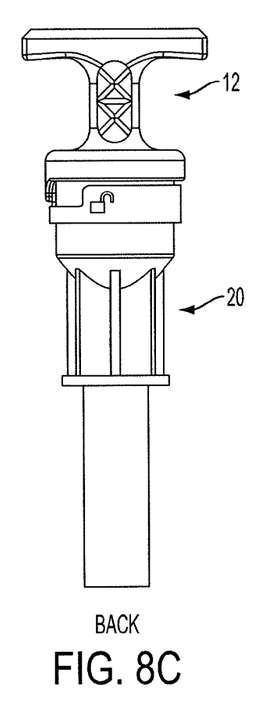
Figure 8D:
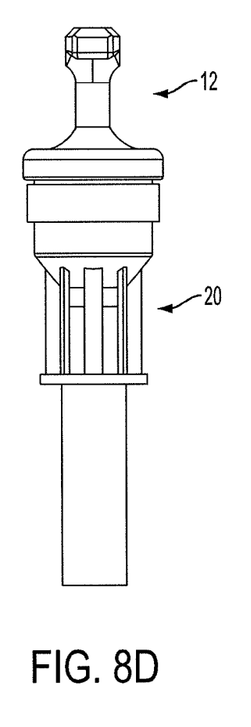
Figure 8E:
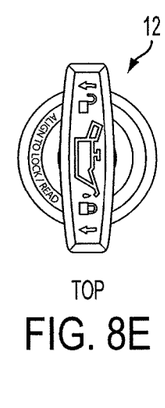

Referring to FIGS. 5-7, the operation of the dipstick assembly with the lock and lock indication systems will be discussed. Upon initial insertion of cap 12 into cup 20, opening 35 of slots 30 is aligned with lugs 29 on the interior of cup 20. (FIG. 4A) The lugs 29 pass into slots 30 until contact with wall 37 is made (and/or until the inside of rim 33 contacts or hits a top surface of rim 44, if properly aligned). (FIG. 4A) To guide proper alignment of cap 12 into cup 20, dipstick assembly 10 utilizes tab 32 in combination with recess 48. As shown in FIG. 6, tab 32 may be aligned with the unlocked position in recess 48. If properly aligned, lugs 29 inside cup 20 will pass into opening 35 of slots 30 until lugs 29 engage wall 37 of slots 30 (and/or with the inside surface of rim 33). (FIG. 4A) Because rim 33, and consequently tab 32, has substantially the same diameter as ridge 45, tab 32 nests into recess 48. (FIGS. 4 and 6.) For the same reason, as shown in FIG. 7, if tab 32 does not engage recess 48, due to substantially similar diameters of rim 33 and ridge 45, tab 32 will engage rim 44 and rim 33 will be spaced apart from the cup. This will also provide a visual indication that cap 12 is not properly aligned for initial engagement with lugs 29 inside of cup 20.

Once cap 12 in disposed in the unlocked position in cup 20 as illustrated in FIG. 6, handle 24 may be rotated in direction R or clockwise from the one end of recess 48 to the opposing end of recess 48. While tab 32 is traveling through the recess, lugs 29 are traveling along the second leg of slots 30 until it engages the end of slots 30 at which point tab 32 will be positioned in the other end of the recess as shown in FIG. 5. Cap 12 may be rotated about 90 degrees. The lug and slot movement cause the tab to travel along the recess from the locked to the unlocked position. Although a preferred embodiment of dipstick assembly 10 is shown and described, variations may be made in accordance with the scope of the invention. For example, uni-directional rotation could instead be in a counter clockwise direction.

The cap and cup may be made of commercially available materials that may or may not be heat stabilized.

The blade, cable or extension of the dipstick may be made from a material that is flexible and chemically resistant to the particular fluid in the fill tube. Thus, for example, when the dipstick is used as an oil dipstick, the blade is preferably made out of cold rolled steel. When the dipstick is used to monitor antifreeze levels, the blade may be constructed out of high density polyethylene or some other material resistant to ethylene glycol and other common antifreeze solutions. The blade is provided with indicia that indicate the fluid level in the fill tube. (FIG. 3.) The blade may be provided with a cross-hatched portion 17 or some other suitable fluid retaining mechanism for retaining fluid in the vicinity of the indicia so that the fluid level can be ascertained.

The seal 18 may include an o-ring type seal. Any conventional o-ring can be used in accordance with the principles of the invention. The composition of the o-ring is based upon the application of use for the dipstick. Preferably, the o-ring is made of nitrile-rubber. In another embodiment, neoprene o-rings may be suitable when the dipstick assembly is used for oil, while a more chemically resistant o-ring made from plastic coated with TEFLON or another polyfluoroethylene may be desirable for use with more corrosive liquids.

In operation, dipstick 10 is inserted, dipstick distal tip 16 end first, into cup 20 and through sleeve 22. Tab 32 on cap 12 is aligned with an end of recess 48, which preferably has a marking identifying that end as the unlocked end of recess 48, and tab 32 is positioned into that corner of the recess. Once tab 32 is in the unlocked position, rim 33 of cap 12 is abutted against rim 44 of cup 20. Using handle 24, cap 12 may be rotated into the locked position. Preferably, cap 12 is rotated clockwise about 90 degrees to so that tab 32 is in the opposite end of recess 48 as a visible indicator that cap 12 is locked to cup 20. As tab 32 is moved relative to cup 20, slots 30 move relative to lugs 29 inside cup 20 and slots 30 and lugs 29 become lockingly engaged.

Figure 9A:
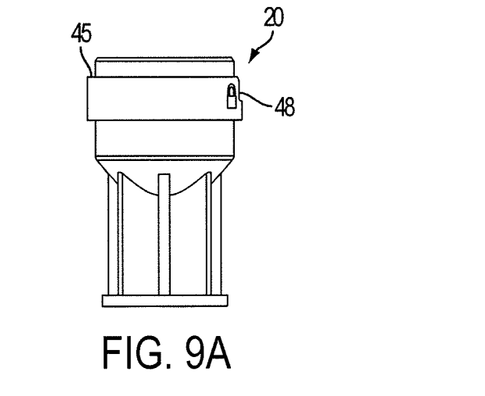
FIGS. 9A and 9B are side and end views, respectively, of the cup.
Figure 9B:
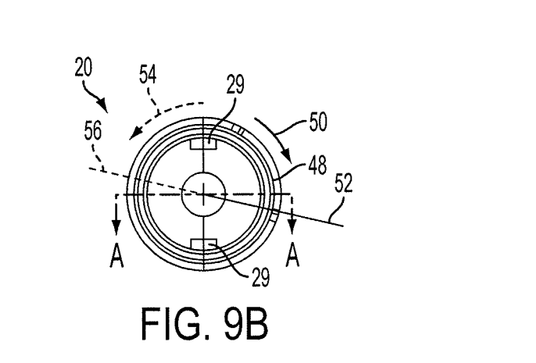
Figure 9C:
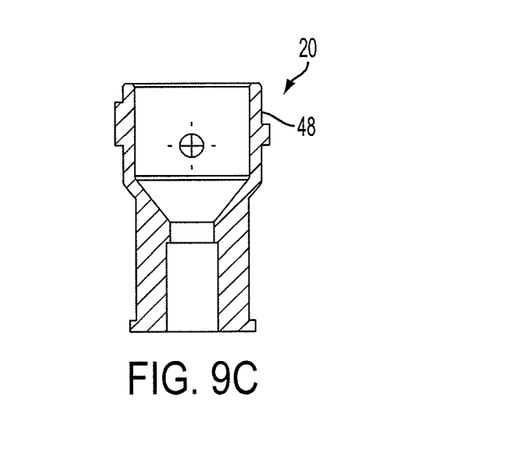
FIG. 9C is a cross-sectional view of the cup taken along line A-A in FIG. 9B.
Figure 9D:
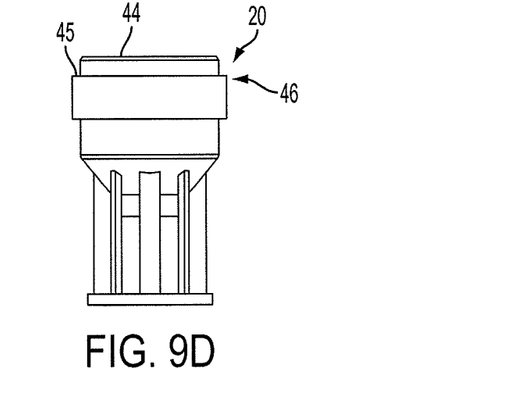
FIGS. 9D-E are side and end views, respectively, of the cup from a different orientation than FIGS. 9A-B.
Figure 9E:
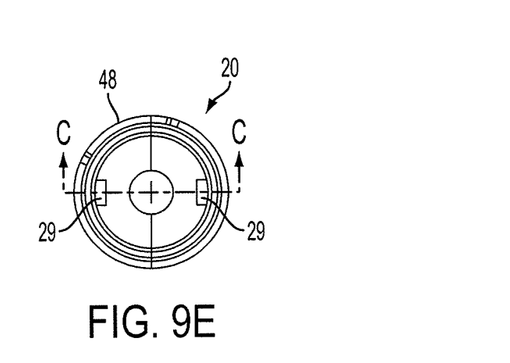
Figure 9F:
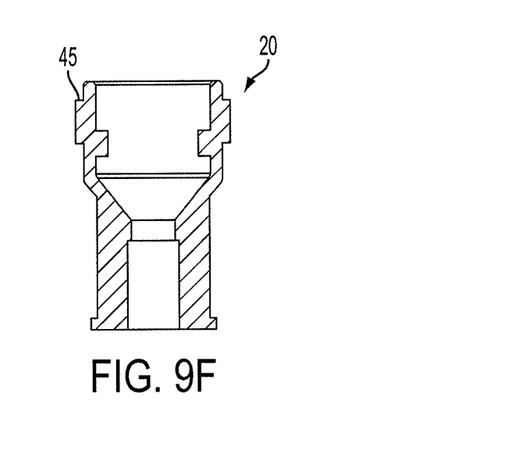
FIG. 9F is a cross-sectional view of the cup taken along line C-C shown in FIG. 9E.

The lock system as described herein provides for the ability to limit the assembly of a locking dipstick to one radial position and for a positive indication that the dipstick is securely in place. The locking system may utilize the combination of the visible tab associated with the lock inside the dipstick assembly so that the tab limits assembly to one radial position for engagement prior to locking rotation and when the tab is moved into the locked position, the lock is reliably and securely in the locked position. As illustrated in FIG. 9B, when cap 12 is rotated in direction 50, cap 12 is always locked in one radial position 52. Because of the configuration of cap 12 and cup 20, in particular, tab 32 and recess 48, cap 12 is prevented from locking by rotation in direction 54 and prevented from locking in radial position 56. The uni-directional configuration allows the user to insert and lock the dipstick the same way every time. The configuration shown and described to accomplish uni-directional engagement is incorporated on the exterior of the dipstick assembly. As such, the tab and recess can serve as a visual indicator. The uni-directional structure alone, however, may be implemented in other ways. For example, the recess may be on the inside of the cup and the tab may be arranged to engage that interior recess so that when locked, the tab and recess are not visible to the operator. In this embodiment, the visual indicator would remain on the exterior using other and/or compatible structure.

Although the foregoing description is directed to the preferred embodiments of the invention, it is noted that other variations and modifications will be apparent to those skilled in the art, and may be made without departing from the spirit or scope of the invention. Moreover, features described in connection with one embodiment of the invention may be used in conjunction with other embodiments, even if not explicitly stated above.

The invention claimed is:

1. A dipstick assembly, comprising:
    a dipstick including a cap with an extension extending from the cap for measuring a fluid level, the cap having a gripping end and a distal engagement end; and
    a cup for cooperatively engaging with the cap,
    a slot and a tab on one of the cap and the cup and a lug and a recess on the other of the cap and the cup, wherein the cap and the cup cooperatively engage in both an unlocked engagement position and a locked engagement position, in the unlocked engagement position the tab is disposed in one end of the recess and a portion of the slot engages the lug;

in the locked engagement position the tab is disposed in another end of the recess and a remaining portion of the slot engages the lug creating a lock between the slot and the lug, wherein the tab and recess limit assembly of the cap and cup to one locked position relative to each other.

2. The dipstick assembly according to claim 1, wherein the slot and tab are on the cap and the lug and recess are on the cup and wherein the cup has a rim and the recess is separated longitudinally from the rim such that engagement of the tab and the rim does not allow the handle and the cup to be in either of the unlocked and locked engagement positions, but engagement of the tab and the recess does.

3. The dipstick assembly according to claim 1, wherein the cap and cup are rotatable about 90 degrees when the tab is positioned in the recess.

4. The dipstick assembly according to claim 1, wherein the slot and tab are on the cap and the lug and recess are on the cup and wherein the cap has a wall and the slot is disposed in the wall.

5. The dipstick assembly according to claim 1, wherein the slot and tab are on the cap and the lug and recess are on the cup and wherein the cup has an interior wall and the lug is disposed on the interior wall.

6. The dipstick assembly according to claim 1, wherein the slot is a bayonet slot.

7. The dipstick assembly according to claim 1, wherein the cap is rotatable in only one direction.

8. The dipstick assembly according to claim 1, further comprising:

an unlocked indicator, wherein in the unlocked engagement position the tab of the dipstick is disposed in one end of the recess associated with the unlocked indicator and a portion of the slot engages the lug of the cup; and a locked indicator, wherein in the locked engagement position the tab of the dipstick is disposed in another end of the recess associated with the locked indicator and a remaining portion of the slot engages the lug creating a lock between the slot and the lug.

9. The dipstick assembly according to claim 1, wherein in the locked engagement position, the slot and the lug are interior and are not visible from an exterior of the dipstick assembly and the tab and recess remain, at least in part, on an exterior of the dipstick assembly and capable of being visible to an operator.

10. The dipstick assembly according to claim 1, wherein the lug is a pair of diametrically opposed lugs and the slot is a pair of diametrically opposed slots.

11. The dipstick assembly according to claim 1, wherein the recess has a circumferential length and the slot has a portion with a circumferential length that is substantially equal to the recess circumferential length.

12. The dipstick assembly according to claim 1, further comprising: a lock indication system comprising a tab on the cap and a recess on the cup, the tab having an unlocked position and a locked position different from the unlocked position, wherein the unlocked position corresponds with one arrangement of the slot and the lug and wherein the locked position corresponds with another arrangement of the slot and lug, which is different from the one arrangement in the unlocked position.

13. The dipstick assembly according to claim 1, wherein the cap and the cup are capable of locking in either a clockwise or a counter clockwise manner, and the tab and recess limit the cap and cup to one locked radial position and unidirectional locking.

14. The dipstick assembly according to claim 1, wherein the slot and tab are on the cap and the lug and recess are on the cup.

15. A dipstick with a lock system, comprising:

a cap with an extension for measuring fluid levels, the cap having an engagement end;

a cup having a receiving end, wherein the engagement end of the cap is removably sealably disposable in the receiving end of the cup; and a lock system comprising a pair of slots on the cap and a pair of lugs on the cup, the pair of slots being capable of engaging the pair of lugs in only one radial position every time the cap and cup are locked together.

16. The dipstick of claim 15, wherein the tab is positioned on the cap relative to the slot at a predetermined location.

17. The dipstick of claim 15, wherein each slot is an L-shaped slot and each lug is disposed in a first leg of the L-shaped slot in the unlocked position and in the first and a second leg of the L-shaped slot in the locked position.

18. The dipstick of claim 15, wherein the extension is a blade or a cable.

19. The dipstick of claim 15, further comprising a lock system comprising a tab on the cap and a recess on the cup, the tab having an unlocked position and a locked position different from the unlocked position, the unlocked position corresponds with one arrangement of the slot and the lug and the locked position corresponds with another arrangement of the slot and lug, which is different from the one arrangement in the unlocked position.

20. The dipstick of claim 17, wherein the recess has a length equal to a length of the second leg.

21. The dipstick of claim 15, wherein the tab and recess further comprise a lock indication system by associating a position of the tab in the recess with a locked position and an unlocked position.

22. The dipstick of claim 21, wherein the lock indication system has markings on one of the tab and the recess.

* * * * *